US009783061B2

(12) United States Patent
Trönnberg et al.

(10) Patent No.: US 9,783,061 B2
(45) Date of Patent: Oct. 10, 2017

(54) METHOD FOR OPERATING AN ELECTRIC DRIVE MODULE

(71) Applicant: e-AAM Driveline Systems AB, Trollhättan (SE)

(72) Inventors: Gabriel Trönnberg, Trollhättan (SE); Emil K. Gavling, Trollhättan (SE)

(73) Assignee: e-AAM Driveline Systems AB, Trollhättan (SE)

( * ) Notice: Subject to any disclaimer, the term of this patent is extended or adjusted under 35 U.S.C. 154(b) by 73 days.

(21) Appl. No.: 14/661,348

(22) Filed: Mar. 18, 2015

(65) Prior Publication Data
US 2016/0272067 A1 Sep. 22, 2016

(51) Int. Cl.
*B60L 3/10* (2006.01)
*B60L 15/20* (2006.01)

(52) U.S. Cl.
CPC ............. *B60L 3/106* (2013.01); *B60L 15/20* (2013.01); *Y02T 10/7275* (2013.01)

(58) Field of Classification Search
CPC ....... B60L 3/106; B60L 15/20; Y02T 10/7275
See application file for complete search history.

(56) References Cited

U.S. PATENT DOCUMENTS

| 5,216,608 A * | 6/1993 | Ito ........................... B60K 28/16 180/197 |
| 6,253,123 B1 * | 6/2001 | Schramm ............ B60T 8/17554 180/170 |
| 6,549,842 B1 | 4/2003 | Hac et al. |
| 7,238,140 B2 | 7/2007 | Gradu |
| 7,491,147 B2 | 2/2009 | Ross |
| 7,845,218 B2 * | 12/2010 | Joe ......................... G01M 17/02 73/146.5 |
| 7,917,274 B2 * | 3/2011 | Hackney ............... B60T 8/1708 701/82 |
| 8,473,138 B2 | 6/2013 | Maki |
| 8,521,385 B2 | 8/2013 | Tronnberg et al. |

(Continued)

FOREIGN PATENT DOCUMENTS

| EP | 1985827 A1 | 10/2008 |
| WO | WO-2013191765 A1 | 12/2013 |

OTHER PUBLICATIONS von Vietinghoff, Anne: "Nichtlineare Regelung von Kraftfahrzeugen in querdynamisch kritischen Fahrsituationen".

(Continued)

*Primary Examiner* — Khoi Tran
*Assistant Examiner* — Robert Nguyen
(74) *Attorney, Agent, or Firm* — Harness, Dickey & Pierce, P.L.C.

(57) ABSTRACT

The present teachings provide a method for controlling transmission of power to a set of wheels of a vehicle. The method can include providing a drive module configured to provide an amount of drive torque for powering the set of vehicle wheels. The method can include determining a yaw rate of the vehicle and a first set of vehicle parameters. The method can include determining a reference yaw rate of the vehicle based on the first set of vehicle parameters. The method can include calculating a yaw rate error based on the yaw rate and the reference yaw rate. The method can include reducing the amount of drive torque provided by the drive module to the vehicle wheels based on the yaw rate error.

20 Claims, 3 Drawing Sheets

(56) References Cited

U.S. PATENT DOCUMENTS

| | | | |
|---|---|---|---|
| 8,535,189 B2* | 9/2013 | Yoshimura | B60K 6/365 |
| | | | 475/205 |
| 8,554,441 B1 | 10/2013 | Johansson et al. | |
| 8,663,051 B2 | 3/2014 | Sten | |
| 8,676,459 B2* | 3/2014 | Stursa | B60K 23/08 |
| | | | 477/120 |
| 8,744,710 B2 | 6/2014 | Hiroya | |
| 8,825,335 B2 | 9/2014 | Rylander | |
| 9,114,711 B2* | 8/2015 | Ozaki | B60L 15/20 |
| 2001/0042652 A1 | 11/2001 | Watson et al. | |
| 2004/0262991 A1* | 12/2004 | Anwar | B60T 8/1755 |
| | | | 303/147 |
| 2005/0278104 A1 | 12/2005 | Masuda et al. | |
| 2006/0058935 A1* | 3/2006 | Ghoneim | B62D 6/003 |
| | | | 701/41 |
| 2007/0074565 A1 | 4/2007 | Jayakumar et al. | |
| 2007/0096557 A1* | 5/2007 | Tamai | B60T 7/122 |
| | | | 303/191 |
| 2008/0183353 A1* | 7/2008 | Post | B60G 17/0165 |
| | | | 701/42 |
| 2009/0272592 A1 | 11/2009 | Gaffney | |
| 2010/0323837 A1 | 12/2010 | Rosemeier et al. | |
| 2011/0066325 A1* | 3/2011 | Lu | B60W 10/06 |
| | | | 701/37 |
| 2013/0144476 A1* | 6/2013 | Pinto | B60T 8/17555 |
| | | | 701/22 |
| 2013/0325323 A1 | 12/2013 | Breed | |
| 2014/0067247 A1* | 3/2014 | Chasse | B60W 20/12 |
| | | | 701/123 |
| 2014/0100750 A1* | 4/2014 | Stares | B60K 17/34 |
| | | | 701/69 |
| 2014/0364264 A1 | 12/2014 | Sten | |
| 2016/0273637 A1* | 9/2016 | Zaers | F16H 48/08 |

OTHER PUBLICATIONS

Klomp Matthijs: "On Drive Force Distribution and Road Vehicle Handling—A Study of Understeer and Lateral Grip".

Klomp, Matthijs: "Longitudinal Force Distribution and Vehicle Handling".

"International Search Report" PCT/IB2011/001994.

* cited by examiner

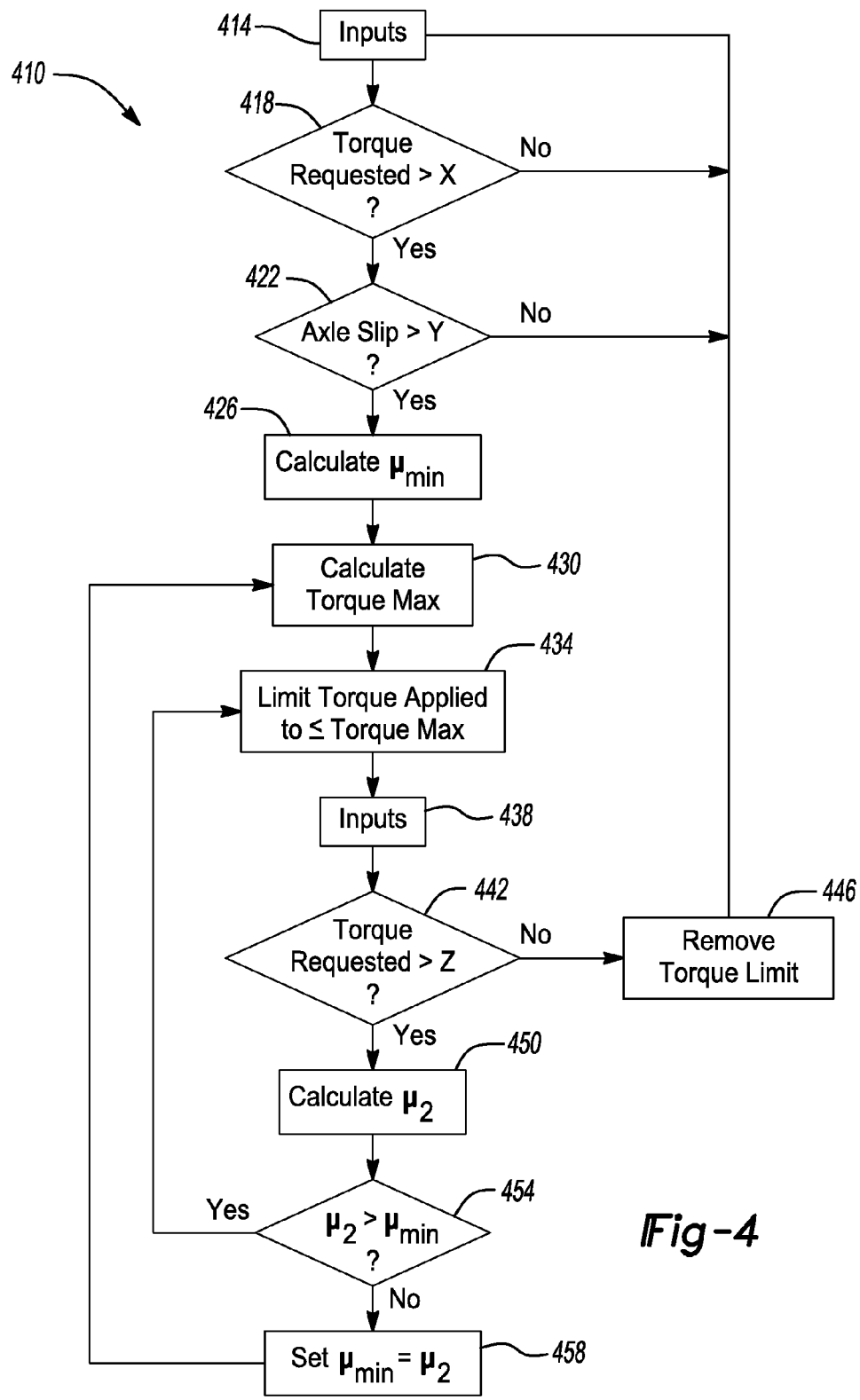

METHOD FOR OPERATING AN ELECTRIC DRIVE MODULE

FIELD

The present disclosure relates to a traction control system and methodology for controlling power transmitted through an electric drive module. The traction control system and methodology reduce or limit drive torque based on yaw and/or a coefficient of friction between the drive wheels and a driving surface.

BACKGROUND

Modern higher-performance automotive vehicles are typically equipped with a system that uses sensors to determine the vehicle's dynamics, the driver's intention and/or environmental information around the vehicle to operate available actuators to conduct suitable control actions to help control traction and performance of the vehicle, as well as energy consumption in an electric or hybrid vehicle. Known systems, particularly of a type of vehicle having a primary driveline, which is employed to drive a first set of vehicle wheels on a full time basis, and a secondary driveline that is employed to drive a second set of vehicle wheels on a part time basis, generally employ the secondary driveline to apply drive torque to prevent or correct slippage of the vehicle wheels associated with the primary driveline. Other systems generally apply brakes at the vehicle's wheels to prevent or correct such slippage. Issues with such systems have been noted and there exists room for improvement.

SUMMARY

This section provides a general summary of the disclosure, and is not a comprehensive disclosure of its full scope or all of its features.

In one form, the present teachings provide a method for controlling transmission of power to a set of wheels of a vehicle. The method can include providing a drive module configured to provide an amount of drive torque for powering the set of vehicle wheels. The method can include determining a yaw rate of the vehicle and a first set of vehicle parameters. The method can include determining a reference yaw rate of the vehicle based on the first set of vehicle parameters. The method can include calculating a yaw rate error based on the yaw rate and the reference yaw rate. The method can include reducing the amount of drive torque provided by the drive module to the vehicle wheels based on the yaw rate error.

In a further form, the present teachings provide a method for controlling transmission of power to a set of wheels of a vehicle. The method can include providing a drive module configured to provide an amount of drive torque for powering the set of vehicle wheels. The method can include determining a yaw acceleration of the vehicle. The method can include determining a reference yaw acceleration based on a first set of vehicle parameters. The method can include calculating a yaw acceleration error based on the yaw acceleration and the reference yaw acceleration. The method can include reducing the amount of drive torque provided by the drive module to the vehicle wheels based on the yaw acceleration error.

In still another form, the present teachings provide a method for controlling transmission of power to a set of wheels of a vehicle. The method can include providing a drive module configured to provide an amount of drive torque for powering the set of vehicle wheels. The method can include determining a first coefficient of friction between the set of vehicle wheels and an operating surface during an acceleration event. The method can include setting a minimum coefficient of friction to equal the first coefficient of friction. The method can include determining a maximum torque amount based on the minimum coefficient of friction. The method can include limiting the drive torque that is provided by the drive module to the maximum torque amount during the acceleration event.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is a diagram of a third logic routine for controlling a drive module such as the drive module of FIG. 1.

Corresponding reference numerals indicate corresponding parts throughout the several views of the drawings.

DETAILED DESCRIPTION

Figure 1:
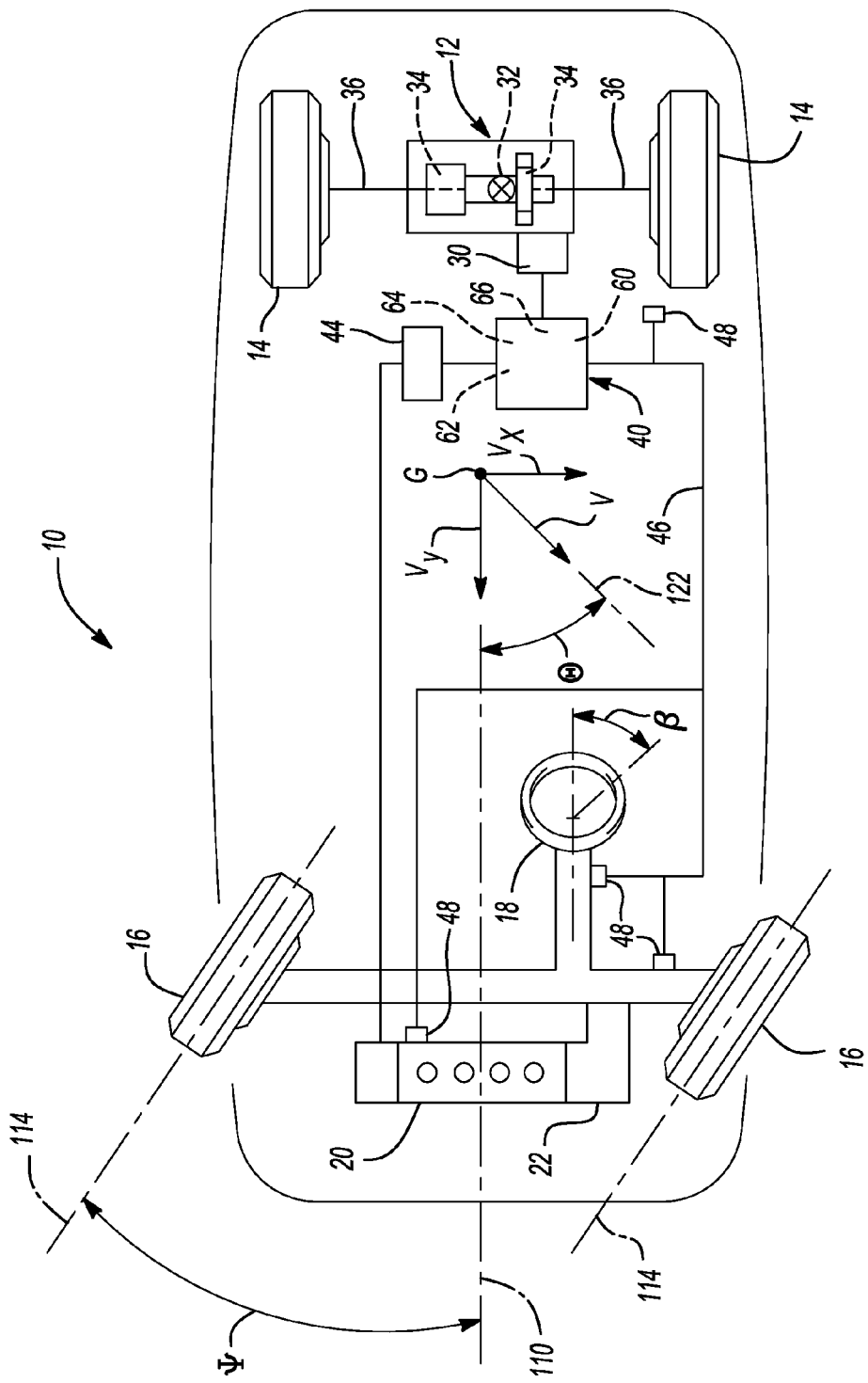
FIG. 1 is a schematic illustration of an exemplary vehicle having a drive module constructed in accordance with the teachings of the present disclosure.

With reference to FIG. 1 of the drawings, an exemplary vehicle is generally indicated by reference numeral 10 having an electric drive module 12, a set of first vehicle wheels 14, a set of second vehicle wheels 16, and a steering device 18. The drive module 12 can be constructed in accordance with the teachings of the present disclosure and employed to drive the first vehicle wheels 14. In the particular example provided, the drive module 12 is employed to selectively drive the rear vehicle wheels 14 (i.e., the drive module can be part of a secondary driveline that is operated on a part-time basis), while a conventional internal combustion engine 20 and transmission 22 are employed to drive the set of second (e.g. front) vehicle wheels 16 on a full-time basis. It will be appreciated, however, that the teachings of the present disclosure have application to various diverse vehicle configurations and as such, it will be understood that the particular example discussed herein and illustrated in the appended drawings is merely exemplary. In this regard, those of skill in the art will appreciate that the teachings of the present disclosure have application to other types of vehicles that have vehicle wheels that are selectively driven. For example, an electric drive module such as electric drive module 12 could additionally or alternatively be employed to drive the front vehicle wheels 16 or as the primary driveline.

The drive module 12 can be configured as described in U.S. Pat. No. 8,663,051, or in accordance with U.S. Patent Application Publication No. 2014/0364264, the disclosures of which are incorporated by reference as if fully set forth in detail herein. Briefly, the drive module 12 can include an electric propulsion motor 30 that is employed to drive a differential assembly 32, and a pair of output members 34 that are at least partly driven by the differential assembly 32 and which drive corresponding axle shafts 36 to thereby drive the rear vehicle wheels 14. The drive module 12 can further include a control module 40 that can be configured to control operation of the drive module 12.

The control module 40 can be coupled to the propulsion motor 30, a source of electricity (e.g., batteries 44), a vehicle data network 46, and one or more sensors 48. The vehicle data network 46 can be any type of system or network for transmitting vehicle data within the vehicle 10, such as a controller area network (CAN) or a local interconnect network (LIN). The batteries 44 can be any type of battery or other suitable electrical storage device (e.g. a capacitor or super capacitor) and can be recharged, for example, via an alternator, a generator and/or regenerative braking.

The sensors 48 can be located at any suitable location on or within the vehicle 10. The sensors 48 can be any type of sensors suitable for sensing or determining present vehicle dynamics, such as accelerometers, position sensors, rotation sensors, speed sensors, torque sensors, yaw sensors, or GPS systems for example. The vehicle dynamics measured by the sensors 48 can include a vehicle velocity (v), actual yaw rate, actual yaw acceleration, actual steering angle (θ, wheel speeds, lateral acceleration, longitudinal acceleration, torque applied to the drive wheels (e.g. rear vehicle wheels 14), and an amount of slippage of the rear vehicle wheels 14 (e.g. axle slip). The sensors 48 can also be configured to determine driver input, including a torque requested and a requested steering angle (δ). The sensors 48 can also be configured to determine characteristics of the surface (e.g. road surface) upon which the vehicle 10 is operating, and the environment in which the vehicle 10 is operating.

As used herein, the term controller refers to an application specific integrated circuit (ASIC), an electronic circuit, a processor (shared, dedicated or group) and memory that executes one or more software or firmware programs, a combinational logic circuit, or any other suitable components that provide the described functionality. The control module 40 can receive data from the vehicle data network 46—that pertains to the present vehicle dynamics, driver input, the surface on which the vehicle 10 is operating, and/or the environment in which the vehicle 10 is operating. The control module 40 can employ the data received from the vehicle data network 46 to control the operation of the drive module 12 to thereby regulate the torque that is transmitted to the rear vehicle wheels 14.

For example, the control module 40 can be operated in an all-wheel drive, pre-emptive mode in which the drive module 12 is operated to preemptively apply torque to the rear vehicle wheels 14 to prevent slippage of the front vehicle wheels 16. Operation of the control module 40 in the pre-emptive mode may be particularly advantageous in situations where the vehicle 10 will need to accelerate from an almost still or zero velocity condition or accelerate when the vehicle 10 is operated in certain situations, such as low friction surfaces, soft surfaces or road inclinations. By way of another example, the control module 40 can be operated in a full electric mode in which the drive module 12 is operated to provide torque to the rear vehicle wheels 14 independent of torque application to the front vehicle wheels 16, such as when only the rear vehicle wheels 14 are driven.

In the example provided, the control module 40 can include a first controller 60 and a second controller 62. The control module 40 can also include additional controllers or modules such as a state estimation module 64 or a third controller 66. In the example provided, the first controller 60, second controller 62, state estimation module 64, and third controller 66 are software modules that are executable on the same hardware controller (e.g. control module 40), though other configurations can be used. The first, second, and third controllers 60, 62, 66 can be gain scheduled proportional controllers that can have different control dynamics and can be individually calibrated. It is understood that the functions of the first, second, and third controller 60, 62, 66 can alternatively be performed by a single, gain scheduled controller (not specifically shown).

In the present example, the vehicle 10 has a center of gravity (G) and is generally longitudinally aligned with a first axis 110. Each of the front vehicle wheels 16 can be generally aligned with a second axis 114. The vehicle velocity (v) can have a lateral component ($v_x$) and a longitudinal component ($v_y$). Accordingly the lateral acceleration can be the rate of change of the lateral velocity ($v_x$) and the longitudinal acceleration can be the rate of change of the longitudinal velocity ($v_y$) (respectively $a_x = dv_x/dt$ and $a_y = dv_y/dt$). The first and second axes 110, 114 define the actual steering angle (ψ). The requested steering angle (β) can be the rotational position of the steering device 18. A third axis 122 can define a yaw angle (θ) with the first axis 110. The actual yaw rate can be the rate of change of the yaw angle (θ) (e.g. $\omega_{actual} = d\theta/dt$). The actual yaw acceleration can be the rate of change of the actual yaw rate (e.g. $\alpha_{actual} = d^2\theta/dt^2$). The control module 40 can be configured to determine the actual yaw acceleration based on the actual yaw rate. The control module 40 can be configured to control operation of one or more elements within the drive module 12 (e.g. the propulsion motor 30) such that a maximum drive torque that is transmitted to the rear vehicle wheels 14 is determined based partly on the requested steering angle (β), vehicle velocity (v), the actual yaw rate, actual yaw acceleration, torque requested by the driver, torque applied to the rear vehicle wheels 14, and/or slippage of the rear vehicle wheels 14 (e.g. axle slip), as will be discussed below.

Figure 2:
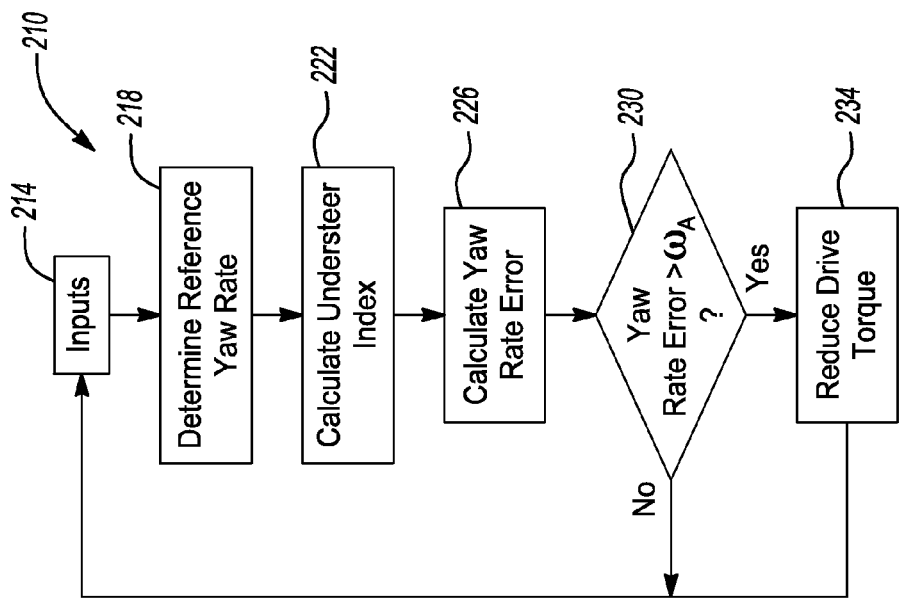
FIG. 2 is a diagram of a first logic routine for controlling a drive module such as the drive module of FIG. 1.

With additional reference to FIG. 2, a first logic routine that can be used by the control module 40 (FIG. 1) is schematically shown in flow chart form by reference numeral 210. In the example provided, the first logic routine 210 can be used by the first controller 60 (FIG. 1) to control drive torque transmitted to the rear vehicle wheels 14 (FIG. 1). The first logic routine 210 can include a plurality of steps. At step 214 the controller 60 can receive input data from the sensors 48 via the vehicle data network 46. The input data received at step 214 can include the requested steering angle (β), wheel speeds, lateral acceleration, longitudinal acceleration, and the actual yaw rate. It is understood that the specific inputs can alternatively be received by the controller 60 as needed rather than all inputs being received at step 214. After the inputs have been received by the controller 60, the logic routine 210 can proceed to step 218.

At step 218, the controller 60 can determine a reference yaw rate. The reference yaw rate can be determined in any suitable manner, using a reference rate logic routine (not shown). For example, the reference yaw rate can be determined using a series of equations and/or calibrated values from reference tables. The reference yaw rate can be based on the requested steering angle (β), the vehicle velocity (v), an estimated surface friction (μ) between the wheels 14 and the road surface, and various predetermined or known vehicle parameters. In the present example, the vehicle velocity (v) can be determined based on the wheel speed and the measured longitudinal acceleration. The estimated surface friction (μ) can be determined based on the measured lateral acceleration and the measured longitudinal acceleration. The predetermined or known vehicle parameters can be parameters specific to the vehicle 10, such as wheel base, weight, and steering kinematics for example. Alternatively, the reference yaw rate can be determined by the state estimation module 64, and can be received as an input by the controller 60 at step 218. After determining (or receiving) the reference yaw rate, the logic routine 210 can proceed to step 222.

At step 222, the controller 60 can calculate an under/oversteer index. The under/oversteer index can be calculated based on the reference yaw rate and the actual yaw rate. The under/oversteer index can be a value indicative of the amount of understeer or oversteer of the vehicle 10. For example, the under/oversteer index can be a value from positive one (+1) to negative one (−1). In the present example, if the actual yaw rate and the actual yaw acceleration (which can either be determined by the controller 60 or the state estimation module 64 and received as an input by the controller 60) are zero and the reference yaw rate is large, then the under/oversteer index can be a value between zero and positive one (+1), and the vehicle 10 is operating in an understeer condition. In the present example, if the actual yaw rate is a large positive value relative to the reference yaw rate, then the under/oversteer index can be a value between zero and negative one (−1), and the vehicle 10 is operating in an oversteer condition. The under/oversteer index can be used for gain scheduling of the controller 60. Alternatively, when the reference yaw rate is calculated by the state estimation module 64, the under/oversteer index can also be calculated by the state estimation module 64, and the under/oversteer index can be received as an input by the controller 60 at step 222. After calculating (or receiving) the under/oversteer index, the logic routine 210 can proceed to step 226.

At step 226, the controller 60 can calculate a yaw rate error. The yaw rate error can be the difference between the actual yaw rate and the reference yaw rate ($\omega_{error} = \omega_{ref} - \omega_{actual}$). After calculating the yaw rate error, the logic routine 210 can proceed to step 230.

At step 230, the controller 60 can determine if the yaw rate error is greater than a predetermined threshold value ($\omega_A$) (e.g. $\omega_{error} > \omega_A$). If the yaw rate error is not greater than the predetermined threshold value ($\omega_A$), then the logic routine 210 can return to step 214. If the yaw rate error is greater than the predetermined threshold value ($\omega_A$), then the logic routine 210 can proceed to step 234. In the present example, the predetermined threshold value ($\omega_A$) is a zero, though other values can be used.

At step 234, the controller 60 can control signals to the drive module 12 to reduce the torque applied to the rear vehicle wheels 14 (i.e. torque output from the drive module 12 and received by the drive wheels 14). For example, the controller 60 can reduce the electrical power provided to the propulsion motor 30 by a predetermined amount. The predetermined amount can be based on the yaw rate error. After the torque applied has been reduced, the logic routine 210 can end or return to step 214.

Figure 3:
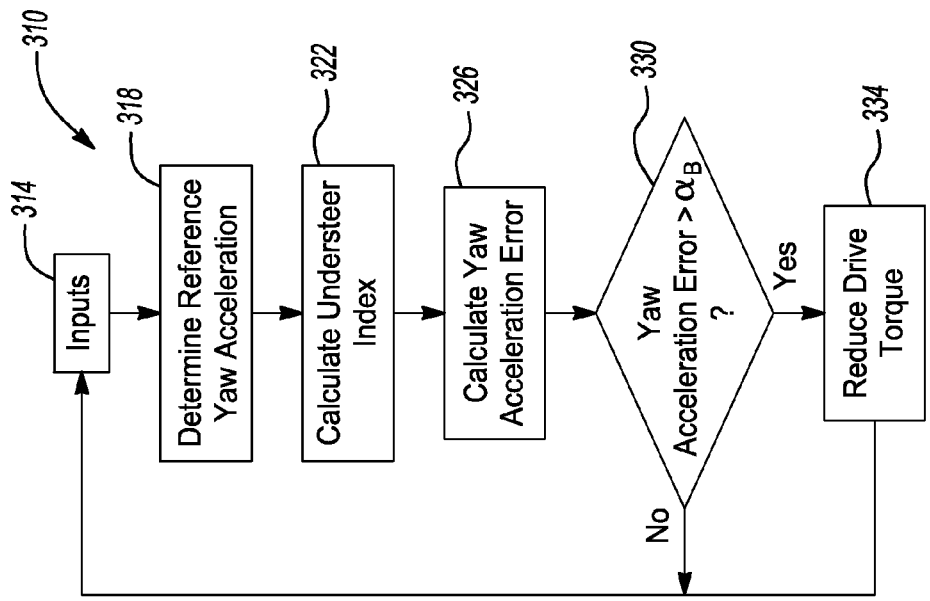
FIG. 3 is a diagram of a second logic routine for controlling a drive module such as the drive module of FIG. 1.

With additional reference to FIG. 3, a second logic routine that can be used by the control module 40 (FIG. 1) is schematically shown in flow chart form by reference numeral 310. In the example provided, the second logic routine 310 can be used by the second controller 62 (FIG. 1) to control drive torque transmitted to the rear vehicle wheels 14 (FIG. 1). The second logic routine 310 can include a plurality of steps. At step 314 the controller 62 can receive input data from the sensors 48 via the vehicle data network 46. The input data received at step 314 can include the requested steering angle (n), wheel speeds, lateral acceleration, longitudinal acceleration, and the actual yaw acceleration. It is understood that the specific inputs can alternatively be received by the controller 62 as needed rather than all inputs being received at step 314. After the inputs have been received by the controller 62, the logic routine 310 can proceed to step 318.

At step 318, the controller 62 can determine a reference yaw acceleration. The reference yaw acceleration can be determined in any suitable manner, using a reference acceleration algorithm (not shown). For example, the reference yaw acceleration can be determined using a series of equations and/or calibrated values from reference tables. The reference yaw acceleration can be based on the requested steering angle ($\beta$), the vehicle velocity (v), the estimated surface friction ($\mu$), and various predetermined or known vehicle parameters. In the present example, the vehicle velocity (v) can be determined based on the wheel speed and the measured longitudinal acceleration. The estimated surface friction ($\mu$) can be determined based on the measured lateral acceleration and the measured longitudinal acceleration. The predetermined or known vehicle parameters can be parameters specific to the vehicle 10, such as wheel base, weight, and steering kinematics for example. Alternatively, the reference yaw acceleration can be determined by the state estimation module 64, and can be received as an input by the controller 62 at step 318. After determining (or receiving) the reference yaw acceleration, the logic routine 310 can proceed to step 322.

At step 322, the controller 62 can calculate the under/oversteer index as described above with reference to step 222. The under/oversteer index can be used for gain scheduling of the controller 62. Alternatively, when the under/oversteer index is calculated by the state estimation module 64, the under/oversteer index can be received as an input by the controller 62 at step 322. When the under/oversteer index is calculated by the state estimation module 64, the same value for the under/oversteer index can be received by the controllers 60 and 62. After calculating the under/oversteer index, the logic routine 310 can proceed to step 326.

At step 326, the controller 62 can calculate a yaw acceleration error. The yaw acceleration error can be the difference between the actual yaw acceleration and the reference yaw acceleration ($\alpha_{error} = \alpha_{ref} - \alpha_{actual}$). After calculating the yaw acceleration error, the logic routine 310 can proceed to step 330.

At step 330, the controller 62 can determine if the yaw acceleration error is greater than a predetermined threshold value ($\alpha_B$) ($\alpha_{error} > \alpha_B$). If the yaw acceleration error is not greater than the predetermined threshold value ($\alpha_B$), then the logic routine 310 can return to step 314. If the yaw acceleration error is greater than the predetermined threshold value ($\alpha_B$), then the logic routine 310 can proceed to step 334. In the present example, the predetermined threshold value ($\alpha_B$) is zero, though other values can be used.

At step 334, the controller 62 can control signals to the drive module 12 to reduce the torque applied to the rear vehicle wheels 14 (i.e. torque output from the drive module 12 and received by the drive wheels 14). For example, the controller 62 can reduce the electrical power provided to the propulsion motor 30 by a predetermined amount. The predetermined amount can be based on the yaw acceleration error. After the torque applied has been reduced, the logic routine 310 can end or return to step 314.

With additional reference to FIG. 4, a third logic routine that can be used by the control module 40 (FIG. 1) is schematically shown in flow chart form by reference numeral 410. In the example provided, the third logic routine 410 can be used by the third controller 66 (FIG. 1) to control drive torque transmitted to the rear vehicle wheels 14 (FIG. 1). The third logic routine 410 can include a plurality of steps. At step 414 the control module 40 can receive input data from the sensors 48 via the vehicle data network 46. The input data received at step 414 can include the torque requested, torque applied, axle slip, lateral acceleration, longitudinal acceleration, and vehicle velocity (v). It is understood that the specific inputs can alternatively be received by the control module 40 as needed rather than all inputs being received at step 414. After the inputs have been received by the control module 40, the logic routine 410 can proceed to step 418

At step 418, the control module 40 can determine if the torque requested is greater than a first predetermined torque value (X). If the torque requested is not greater than the first predetermined torque value (X), then the logic routine 410 can return to step 414. If the torque requested is greater than a first predetermined torque value (X), then the logic routine 410 can proceed to step 422.

At step 422, the control module 40 can determine if the axle slip is greater than a predetermined slippage value (Y). If the axle slip is not greater than a predetermined slippage value (Y), then the logic routine 410 can return to step 414. If the axle slip is greater than a predetermined slippage value (Y), then the logic routine 410 can proceed to step 426.

At step 426, the control module 40 can calculate the coefficient of friction ($\mu$) between the road surface and the rear wheels 14 and set that value as a minimum coefficient of friction ($\mu_{min}$). The coefficient of friction ($\mu$) can be estimated based on the lateral acceleration and the longitudinal acceleration and predetermined or known vehicle parameters. After the control module 40 has set the minimum coefficient of friction ($\mu_{min}$), the logic routine 410 can proceed to step 430.

At step 430, the control module 40 can calculate the maximum drive torque. The maximum drive torque can be based on the minimum coefficient of friction ($\mu_{min}$) and predetermined or known vehicle parameters. The maximum drive torque can be calculated or determined using a suitable equation or look-up table. After determining the maximum drive torque, the logic routine 410 can proceed to step 434.

At step 434, the control module 40 can control signals to the drive module 12 to reduce and limit the torque applied (i.e. torque output from the drive module 12 and received by the drive wheels 14) to be less than or equal to the maximum drive torque. For example, the control module 40 can reduce and limit the electrical power provided to the propulsion motor 30. After the control module 40 reduces and limits the torque applied, the logic routine 410 can proceed to step 438.

At step 438, the control module 40 can again receive input data from the sensors 48 via the vehicle data network 46 similar to step 414. After receiving the inputs, the logic routine 410 can proceed to step 442.

At step 442, the control module 40 can determine if the torque requested is greater than a second predetermined torque value (Z). The second predetermined torque value (Z) can be equal to the first predetermined torque value (X). Alternatively, the second predetermined torque value (Z) can be greater than or less than the first predetermined torque value (X). If the torque requested is not greater than the second predetermined torque value (Z), then the logic routine 410 can proceed to step 446. If the torque requested is greater than the second predetermined torque value (Z), then the logic routine 410 can proceed to step 450.

At step 446, the control module 40 can remove the torque limit and return to step 414.

Returning to step 442, if the torque requested is greater than the second predetermined torque value (Z), then the logic routine 410 can proceed to step 450. At step 450, the control module 40 can again calculate the coefficient of friction ($\mu$) between the rear wheels 14 and the road surface, similar to step 426, but can set the coefficient of friction ($\mu$) as a second coefficient of friction value ($\mu_2$). After setting the second coefficient of friction value ($\mu_2$), the logic routine 410 can proceed to step 454.

At step 454, the control module 40 can determine if the second coefficient of friction value ($\mu_2$) is greater than the minimum coefficient of friction value ($\mu_{min}$). If the second coefficient of friction value ($\mu_2$) is greater than the minimum coefficient of friction value ($\mu_{min}$), then the logic routine 410 can return to step 434. If the second coefficient of friction value ($\mu_2$) is not greater than the minimum coefficient of friction value ($\mu_{min}$), then the logic routine 410 can proceed to step 458.

At step 458, the control module 40 can set the minimum coefficient of friction value ($\mu_{min}$) to be equal to the second coefficient of friction value ($\mu_2$). After the control module 40 sets the minimum coefficient of friction value ($\mu_{min}$) to equal the second coefficient of friction value ($\mu_2$), the logic routine 410 can return to step 430 to recalculate the maximum drive torque based on the new minimum coefficient of friction value ($\mu_{min}$; i.e. $\mu_2$).

In operation, the control module 40 (e.g. via controllers 60, 62) can be configured to use one or both of the logic routines 210, 310 to reduce the amount of torque applied to the rear vehicle wheels 14 based on yaw characteristics of the vehicle 10 in order to improve handling of the vehicle 10. When the logic routines 210, 310 are used together, then the control module 40 can reduce the power to the propulsion motor 30 to reduce the torque applied if either the yaw rate error or the yaw acceleration error is greater than its respective predetermined threshold value (e.g. $\omega_{error} > \omega_A$; OR $\alpha_{error} > \alpha_B$). In other words, when either the actual yaw rate or the actual yaw acceleration is sufficiently different than the reference yaw rate and reference yaw acceleration for the present conditions of the vehicle 10, the torque applied can be reduced.

The control module 40 (e.g. via controller 66) can also be configured to use the third logic routine 410 separately, or in conjunction with the first and/or second logic routines 210, 310, to limit the torque applied to a maximum torque value during a particular acceleration event. An acceleration event can begin when the operator requests an amount of torque that is greater than the first predetermined torque value (X). The acceleration event can last until the amount of torque requested drops below the second predetermined torque value (Z). The control module 40 can set and maintain the maximum torque value based on the lowest coefficient of friction ($\mu_{min}$) that has been estimated during the particular acceleration event. The control module 40 can maintain the limit (e.g. maximum torque) on the torque applied until the acceleration event is over. In this way, the maximum torque can only be reduced during a particular acceleration event and cannot increase until the acceleration event has ended.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for controlling transmission of power to a set of wheels of a vehicle, the method comprising:
providing a drive module including an electric motor configured to provide an amount of drive torque for powering the set of vehicle wheels;
determining a yaw acceleration of the vehicle;
determining a reference yaw acceleration based on a first set of vehicle parameters;
calculating a yaw acceleration error based on the yaw acceleration and the reference yaw acceleration; and
reducing the amount of drive torque provided by the drive module to the vehicle wheels based on the yaw acceleration error by reducing an amount of torque output by the electric motor.

2. The method of claim 1, further comprising reducing the amount of drive torque provided by the drive module to the vehicle wheels when the yaw acceleration error is greater than a first predetermined error value, wherein the yaw acceleration error is equal to the difference between the yaw acceleration and the reference yaw acceleration.

3. The method of claim 1, wherein the first set of vehicle parameters includes a requested steering angle, a vehicle velocity, an estimated surface friction, and a set of predetermined vehicle characteristics.

4. The method of claim 1, wherein the step of reducing the amount of torque output by the electric motor further includes: limiting an amount of electrical power to the electrical motor.

5. The method of claim 1, wherein the drive module includes a differential configured to receive input torque from the electric motor and output differential torque to the set of vehicle wheels.

6. A method for controlling transmission of power to a set of wheels of a vehicle, the method comprising:
providing a drive module configured to provide an amount of drive torque for powering the set of vehicle wheels, the drive module including an electric motor;
determining a yaw rate of the vehicle and a first set of vehicle parameters;
determining a reference yaw rate of the vehicle based on the first set of vehicle parameters;
determining a yaw acceleration of the vehicle;
determining a reference yaw acceleration based on a second set of vehicle parameters;
calculating a yaw rate error based on the yaw rate and the reference yaw rate;
calculating a yaw acceleration error based on the yaw acceleration and the reference yaw acceleration; and
reducing the amount of drive torque provided by the drive module to the vehicle wheels based on the yaw rate error and the yaw acceleration error by reducing an amount of torque output by the electric motor.

7. The method of claim 6, further comprising reducing the amount of drive torque provided by the drive module to the vehicle wheels when the yaw rate error is greater than a first predetermined error value, wherein the yaw rate error is equal to the difference between the yaw rate and the reference yaw rate.

8. The method of claim 6, wherein the first set of vehicle parameters includes a requested steering angle, a vehicle velocity, an estimated surface friction, and a set of predetermined vehicle characteristics.

9. The method of claim 6, wherein the step of reducing the amount of torque output by the electric motor further includes: limiting an amount of electrical power to the electrical motor.

10. The method of claim 6, further comprising reducing the amount of drive torque provided by the drive module to the vehicle wheels when the yaw acceleration error is greater than a first predetermined error value, wherein the yaw acceleration error is equal to the difference between the yaw acceleration and the reference yaw acceleration.

11. The method of claim 6, wherein the second set of vehicle parameters includes a requested steering angle, a vehicle velocity, an estimated surface friction, and a set of predetermined vehicle characteristics.

12. The method of claim 6, wherein the method further comprises: limiting an amount of electrical power to the electrical motor when either the yaw rate error is greater than a first predetermined value, or the yaw acceleration error is greater than a second predetermined value.

13. The method of claim 6, wherein the drive module includes a differential, the differential configured to receive input torque from the electric motor and output differential torque to the set of vehicle wheels.

14. A method for controlling transmission of power to a set of wheels of a vehicle, the method comprising:
providing a drive module including an electric motor configured to provide an amount of drive torque for powering the set of vehicle wheels;
determining an amount of torque requested by an operator of the vehicle;
determining a start of an acceleration event, the start of the acceleration event being when the amount of torque requested is greater than or equal to a first predetermined amount of torque;
determining a first coefficient of friction between the set of vehicle wheels and an operating surface during the acceleration event;
determining a first maximum torque amount based on the first coefficient of friction;
limiting the drive torque that is provided by the drive module to be less than the first maximum torque amount until an end of the acceleration event; and
determining the end of the acceleration event, the end of the acceleration event being when the amount of torque requested is less than a second predetermined amount of torque.

15. The method of claim 14, wherein the first predetermined amount of torque is equal to the second predetermined amount of torque.

16. The method of claim 14, further comprising:
determining a second coefficient of friction between the set of vehicle wheels and the operating surface during the acceleration event and after limiting the drive torque to be less than the first maximum torque amount;
determining a second maximum torque amount based on the second coefficient of friction if the second coefficient of friction is less than the first coefficient of friction; and
limiting the drive torque that is provided by the drive module to be less than the second maximum torque amount until the end of the acceleration event if the second coefficient of friction is less than the first coefficient of friction.

17. The method of claim 14, further comprising:
determining a lateral acceleration and a longitudinal acceleration of the vehicle;

wherein the first coefficient of friction is estimated based on the lateral and longitudinal accelerations of the vehicle.

18. The method of claim 14, further comprising:
determining an amount of slippage of the set of vehicle wheels; and
limiting the drive torque that is provided by the drive module only when the amount of slippage is greater than a predetermined slippage value.

19. The method of claim 14, further comprising:
calculating one of a yaw rate error and a yaw acceleration error; and
reducing the drive torque that is provided by the drive module based on the one of the yaw rate error and the yaw acceleration error;
wherein the yaw rate error is calculated based on a yaw rate of the vehicle and a reference yaw rate, and the yaw acceleration error is based on a yaw acceleration of the vehicle and a reference yaw acceleration.

20. The method of claim 14, wherein the drive module includes a differential configured to receive input torque from the electric motor and output differential torque to the set of vehicle wheels.

\* \* \* \* \*

UNITED STATES PATENT AND TRADEMARK OFFICE
CERTIFICATE OF CORRECTION

PATENT NO. : 9,783,061 B2  
APPLICATION NO. : 14/661348  
DATED : October 10, 2017  
INVENTOR(S) : Gabriel Trönnberg et al.

Page 1 of 1

It is certified that error appears in the above-identified patent and that said Letters Patent is hereby corrected as shown below:

In the Specification

In Column 3, Detailed Description, Line 24, delete "(0,", insert --(ψ)--, therefor.

In Column 3, Detailed Description, Line 30, delete "(6),", insert --β--, therefor.

In Column 6, Detailed Description, Line 1, delete "(n,", insert --β--, therefor.

Signed and Sealed this  
Fifth Day of December, 2017

Joseph Matal  
*Performing the Functions and Duties of the*  
*Under Secretary of Commerce for Intellectual Property and*  
*Director of the United States Patent and Trademark Office*